United States Patent
Kim et al.

(10) Patent No.: US 9,892,350 B2
(45) Date of Patent: Feb. 13, 2018

(54) IMAGE-FORMING APPARATUS HAVING INTERNAL SECURITY PAPER DETECTION UNIT AND IMAGE-FORMING METHOD THEREOF

(71) Applicant: ELECTRONICS AND TELECOMMUNICATIONS RESEARCH INSTITUTE, Daejeon (KR)

(72) Inventors: Min Sik Kim, Daejeon (KR); Seung Jin Ryu, Daejeon (KR); Han Jun Yoon, Daejeon (KR); Do Hoon Lee, Daejeon (KR); Nak Jun Jeong, Seoul (KR); Min Ho Noh, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 7 days.

(21) Appl. No.: 15/138,662

(22) Filed: Apr. 26, 2016

(65) Prior Publication Data

US 2016/0321527 A1    Nov. 3, 2016

(30) Foreign Application Priority Data

Apr. 28, 2015  (KR) .......................... 10-2015-0059723

(51) Int. Cl.
| | |
|---|---|
| *G06K 15/00* | (2006.01) |
| *G06K 15/16* | (2006.01) |
| *B65H 1/26* | (2006.01) |
| *H04N 1/00* | (2006.01) |
| *B41F 11/02* | (2006.01) |
| *B65H 7/02* | (2006.01) |

(52) U.S. Cl.
CPC .......... *G06K 15/4095* (2013.01); *B41F 11/02* (2013.01); *B65H 1/266* (2013.01);
(Continued)

(58) Field of Classification Search
CPC .............. G06K 15/4095; G06K 15/16; G06K 15/4025; G06K 15/4065; B41F 11/02;
(Continued)

(56) References Cited

U.S. PATENT DOCUMENTS

| | | | |
|---|---|---|---|
| 2005/0168766 A1* | 8/2005 | Troyansky | G06F 21/608 358/1.14 |
| 2005/0274791 A1* | 12/2005 | Ikeda | B65H 7/12 235/375 |
| 2006/0181716 A1* | 8/2006 | Hoshina | G06K 19/07749 358/1.1 |
| 2009/0033994 A1* | 2/2009 | Urakawa | H04N 1/32138 358/1.15 |

(Continued)

FOREIGN PATENT DOCUMENTS

| | | |
|---|---|---|
| JP | 2009-086650 A | 4/2009 |
| KR | 10-2011-0115460 A | 10/2011 |

(Continued)

*Primary Examiner* — Iriana Cruz
(74) *Attorney, Agent, or Firm* — LRK Patent Law Firm (57) ABSTRACT

An image-forming apparatus having an internal security paper detection unit and an image-forming method related to the apparatus. The image-forming apparatus controls a paper feed unit so as to feed a single sheet of paper from a paper stack unit when a command for forming an image on RF tag paper is input, controls a paper transfer unit so as to provide the paper fed from a security paper cassette unit to an image-forming unit along a transfer path, and controls the image-forming unit so as to normally form a desired image on the moving RF tag paper when an RF tag detection signal is input from an RF tag, paper detection unit, whereby the image is formed only on the security paper in which an RF tag is inserted and thus illegal leakage of documents may be prevented.

16 Claims, 6 Drawing Sheets

(52) U.S. Cl.
CPC ............... *B65H 7/02* (2013.01); *G06K 15/16* (2013.01); *G06K 15/4025* (2013.01); *G06K 15/4065* (2013.01); *H04N 1/0001* (2013.01); *H04N 1/00037* (2013.01); *H04N 1/00058* (2013.01); *H04N 1/00076* (2013.01); *H04N 1/00082* (2013.01); *B65H 2405/113* (2013.01); *B65H 2511/414* (2013.01); *B65H 2511/415* (2013.01); *B65H 2513/40* (2013.01); *B65H 2553/52* (2013.01)

(58) Field of Classification Search
CPC ...... B65H 1/266; B65H 7/02; B65H 2553/52; H04N 1/0001; H04N 1/00037; H04N 1/00058; H04N 1/00076; H04N 1/00082
See application file for complete search history.

(56) References Cited

U.S. PATENT DOCUMENTS

| | | | | |
|---|---|---|---|---|
| 2015/0069133 | A1* | 3/2015 | Qian | G06K 19/02 235/492 |
| 2015/0227771 | A1* | 8/2015 | Koezuka | G06K 7/0095 340/10.6 |

FOREIGN PATENT DOCUMENTS

| | | |
|---|---|---|
| KR | 10-2011-0138207 A | 12/2011 |
| KR | 10-2013-0020019 A | 2/2013 |

\* cited by examiner

FIG. 6

IMAGE-FORMING APPARATUS HAVING INTERNAL SECURITY PAPER DETECTION UNIT AND IMAGE-FORMING METHOD THEREOF

CROSS REFERENCE TO RELATED APPLICATION

This application claims the benefit of Korean Patent Application No. 10-2015-0059723, filed Apr. 28, 2015, which is hereby incorporated by reference in its entirety into this application.

BACKGROUND OF THE INVENTION

1. Technical Field

The present invention relates generally to an image-forming apparatus having an internal security paper detection unit and a related image-forming method. More particularly, the present invention relates to an image-forming apparatus having an internal security paper detection unit and an image-forming method related to the apparatus, in which a security paper detection unit is contained in a paper cassette unit in order to form an image only on security paper in which an RF tag is inserted.

2. Description of the Related Art

Generally, companies invest a lot of time and money in technology in order to develop new products. Also, many companies spend a lot of time and money on security in order to stay ahead of their competitors.

Technology leaks are committed by moving data outside companies using storage media or primed documents. Accordingly, security technology for forbidding storage media from being carried out has been developed. However, it is difficult to prevent leakages of documents due to problems such as invasion of privacy and the like.

In order to solve the above-mentioned problem, technology in which sensitive documents may be prevented from being leaked in such a way that a tag made of metallic material is attached to print sheets, sensitive documents are printed on the security paper to which the detectable tag is attached, and a tag reader detects the printed paper when it passes through a predetermined gate is being developed.

However, it is not easy to detect security paper, to which the tag made of metallic material is attached, at the gate. Furthermore, if documents for which a high level of security is required are printed or copied not on security paper but on common paper simply by loading it into a copy machine, there is no way to detect this at the gate.

SUMMARY OF THE INVENTION

Accordingly, the present invention has been made keeping in mind the above problems, and an object of the present invention is to provide an image-forming apparatus having an internal security detection unit and an image-forming method related to the apparatus in which a security paper detection unit is contained in a paper cassette unit in order to form an image only on security paper in which an RF tag is inserted.

In order to accomplish the above object, an image-forming apparatus according to an embodiment of the present invention includes a security paper cassette unit that includes a paper stack unit in which sheets of paper are stacked and a paper feed unit for feeding the paper stacked in the paper stack unit; a security paper detection unit that includes an RF tag paper detection unit for detecting whether the paper fed by the paper feed unit is RF tag paper; an image-forming unit for forming an image on paper; a paper transfer unit for providing the paper fed from the security paper cassette unit to the image-forming unit along a transfer path; and a control unit that controls the paper feed unit so as to feed a single sheet of paper from the paper stack unit if a command for forming an image on RF tag paper is input, controls the paper transfer unit so as to provide the paper fed from the security paper cassette unit to the image-forming unit along the transfer path, and then controls the image-forming unit so as to normally form a desired image on the moving RF tag paper if an RF tag detection signal is input from the RF tag paper detection unit.

The security paper detection unit may further includes a paper movement detection unit for detecting whether paper is being fed; and the control unit may control the RF tag paper detection unit so as to be activated if a paper feeding detection signal is input from the paper movement detection unit.

If a paper feeding completion signal is input from the paper movement detection unit but the RF tag detection signal is not input from the RF tag paper detection unit, the control unit may generate a warning alarm and simultaneously control the image-forming unit so as to stop forming an image on the moving paper.

In order to accomplish the above object, an image-forming apparatus according to another embodiment of the present invention includes a security paper cassette unit that includes a paper stack unit in which sheets of paper are stacked and a paper feed unit for feeding the paper stacked in the paper stack unit; a security paper detection unit that includes a paper movement detection unit for detecting whether paper is being fed and an RF tag paper detection unit for outputting an RF tag presence/absence signal by detecting whether the paper detected by the paper movement detection unit is RF tag paper when a paper feeding detection signal is input from the paper movement detection unit; an image-forming unit for forming an image on paper; a paper transfer unit for providing the paper fed from the security paper cassette unit to the image-forming unit along a transfer path; and a control unit that controls the paper feed unit so as to feed a single sheet of paper from the paper stack unit if a command for forming an image on RF tag paper is input, controls the paper transfer unit so as to provide the paper fed from the security paper cassette unit to the image-forming unit along the transfer path, and then controls the image-forming unit so as to normally form a desired image on the RF tag paper unless an RF tag absence signal is provided from the RF tag paper detection unit.

The RF tag paper detect on unit is activated if the paper feeding detection signal is input from the paper movement detection unit, and may supply power from an RF transmission antenna to the RF tag paper.

The RF tag paper detection unit may include a transmission part for supplying power to an RF tag of the RF tag paper through an RF transmission antenna, a reception part for receiving a tag signal from the RF tag through an RF reception antenna, a signal shaping part for converting the tag signal received by the reception part into a digital signal, and a control part for determining whether moving paper is RF tag paper based on the digital signal input from the signal shaping part.

The reception part may receive the tag signal from the moving RF tag paper not only through the RF reception antenna but also through the RF transmission antenna.

The transmission part may include multiple switching functions that are capable of adjusting an intensity of output power of the RF transmission antenna, and the control part may control the multiple switching functions of the transmission part based on a level of the tag signal from the RF tag, which is received by the reception part.

The control unit may include a connector terminal for receiving an RF tag absence signal, which is output from the RF tag paper detection unit, and may generate a jam error if the RF tag absence signal is input via the connector terminal.

The control unit may include a connector terminal for receiving an RF tag absence signal, which is output from the RF tag paper detection unit, and may control the image-forming unit so as not to form an image on the moving paper but to print the paper as a blank page if the RF tag absence signal is input via the connector terminal.

In order to accomplish the above object, there is provided an image-forming method performed in an image-forming apparatus that includes a paper stack unit in which sheets of paper are stacked and an image-forming unit for forming an image on paper according a further embodiment of the present invention, the method including feeding paper from the paper stack unit if a command for forming an image on RF tag paper is input; detecting whether paper is moving by being fed; detecting whether the moving paper is RF tag paper if a paper feeding signal is input as a result of the detecting whether the paper is moving; transferring the paper supplied in the feeding to the image-forming unit along a transfer path; and normally forming a desired image on the RF tag paper by controlling the image-forming unit if an RF tag absence signal is not provided in the detecting whether the moving paper is RF tag paper.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Hereinafter, a preferred embodiment of an image-forming apparatus having an internal security paper detection unit and an image-forming method will be described with reference to the accompanying drawings. Prior to the following detailed description of the present invention, terms that indicate elements of the present invention are described in consideration of the function of each of the elements, but the elements should not be construed as being limited by the terms.

Figure 1:
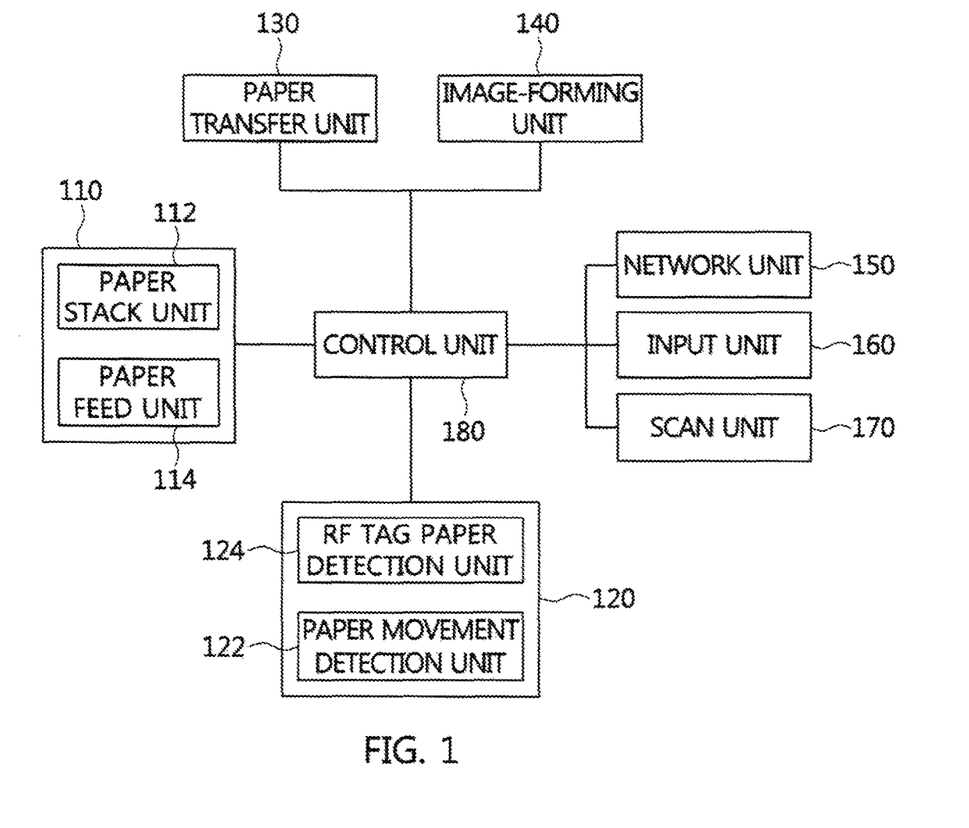
FIG. 1 is a block diagram of an image-forming apparatus according to an embodiment of the present invention.

FIG. 1 is a block diagram of an image-forming apparatus according to an embodiment of the present invention.

As illustrated in FIG. 1, the image-forming apparatus includes a security paper cassette unit 110, a security paper detection unit 120, a paper transfer unit 130, an image-forming unit 140, a network unit 150, an input unit 160, a scan unit 170, and a control unit 180.

The security paper cassette unit 110, in which sheets of security paper, in which an RF tag is inserted, are stacked, is a unit for feeding security paper when an image is formed on the paper. The security paper cassette unit 110 may include a paper stack unit 112 and a paper feed unit 114.

The paper stack unit 112 is a paper input tray from which security paper, in which an RF tag is inserted, is fed. However, because a user may load sheets of common paper in the paper stack unit 112 for copying or printing, the present invention includes the process of detecting whether paper fed from the paper stack unit 112 is security paper, in which an RF tag is inserted, or common paper. The paper feed unit 114 includes a paper feeding roller, and supplies security paper fed from the paper stack unit 112 to the security paper detection unit 120.

The security paper detection unit 120 is a unit for detecting security paper in which an RF tag is inserted, and may include a paper movement detection unit 122 and an RF tag paper detection unit 124.

When the paper feed unit 114 is operated by the control unit 180, the paper movement detection unit 122 detects whether paper is being fed and whether feeding of paper is completed. To this end, the paper movement detection unit 122 may comprise a light emission unit (not illustrated) for emitting light and a light reception unit (not illustrated) for receiving the light emitted from the light emission unit.

The RF tag paper detection unit 124 serves to detect whether the moving paper is RF tag paper or common paper. Here, it is desirable for RF transmission and/or reception antennas of the RF tag paper detection unit 124 to be arranged to cover the entire width of the paper so as to enable an RF tag inserted in the security paper to be supplied with power and to be detected regardless of the location of the RF tag in the security paper.

The paper transfer unit 130 includes a transfer roller and transfers paper fed from the security paper cassette unit 110 to the image-forming unit 140. The image-forming unit 140 is a unit for forming the image that is to be copied or printed on the paper.

The network unit 150 is a unit for receiving print command information from a user's computer (not illustrated), the input unit 160 is a unit for receiving commands for copying and the like from a user, and the scan unit 170 is a unit for scanning a manuscript, which is placed on a flat glass for copying or the like.

The control unit 180 receives print command information from a PC via the network unit 150. If the received print command information includes a security paper print command, the control unit 180 may automatically select the security paper cassette unit 110 as the paper cassette unit.

Meanwhile, the control unit 180 may receive a copy command from a user via the input unit 160. If the copy command is input via the input unit 160, the control unit 180 controls the scan unit 179 so as to scan a manuscript on the flat glass or an automatically supplied manuscript. Here, if document security information is detected in the scanned manuscript, the control unit 180 may automatically select the security paper cassette unit 110 as the paper cassette unit.

The control unit 180 controls the paper feed unit 114 in order to feed security paper, in which an RF tag is inserted, from the paper stack unit 112 of the security paper cassette unit 110. Then, if a paper feeding detection signal is input from the paper movement detection unit 122, the control unit 180 controls the RF tag paper detection unit 124 in order to supply power from the RF transmission antenna of the RF tag paper detection unit 124 to the RF tag of the security paper, and then checks whether an RF tag detection signal is input from the RF tag paper detection unit 124.

Before a paper feeding completion signal is input from the paper movement detection unit 122, the control unit 180 controls the paper transfer unit 130 so as to transfer paper to the image-forming unit 140 along a transfer path. Then, if an RF tag detection signal is input from the RF tag paper detection unit 124, the control unit 180 determines that security paper is fed in, and thus prints a desired image, that is, a document received by a PC or an image of the scanned manuscript, on the security paper.

However, while the paper transfer unit 130 transfers paper to the image-forming unit 140 along the transfer path, unless an RF tag detection signal is input from the RF tag paper detection unit 124 before a paper feeding completion signal is input, the control unit 180 generates a warning alarm and controls the image-forming unit 140 so as to stop the operation for forming an image.

In FIG. 1, the paper movement detection unit 122 and the RF tag paper detection unit 124 may operate in conjunction with the control unit 180. However, in FIG. 1, if the security paper detection unit 120 and the control unit 180 operate as a single unit, because it is necessary to design the apparatus again or to buy a new image-forming apparatus, the security detection unit 120 needs to be designed so as to be operable separately from the control unit 180.

Figure 2:
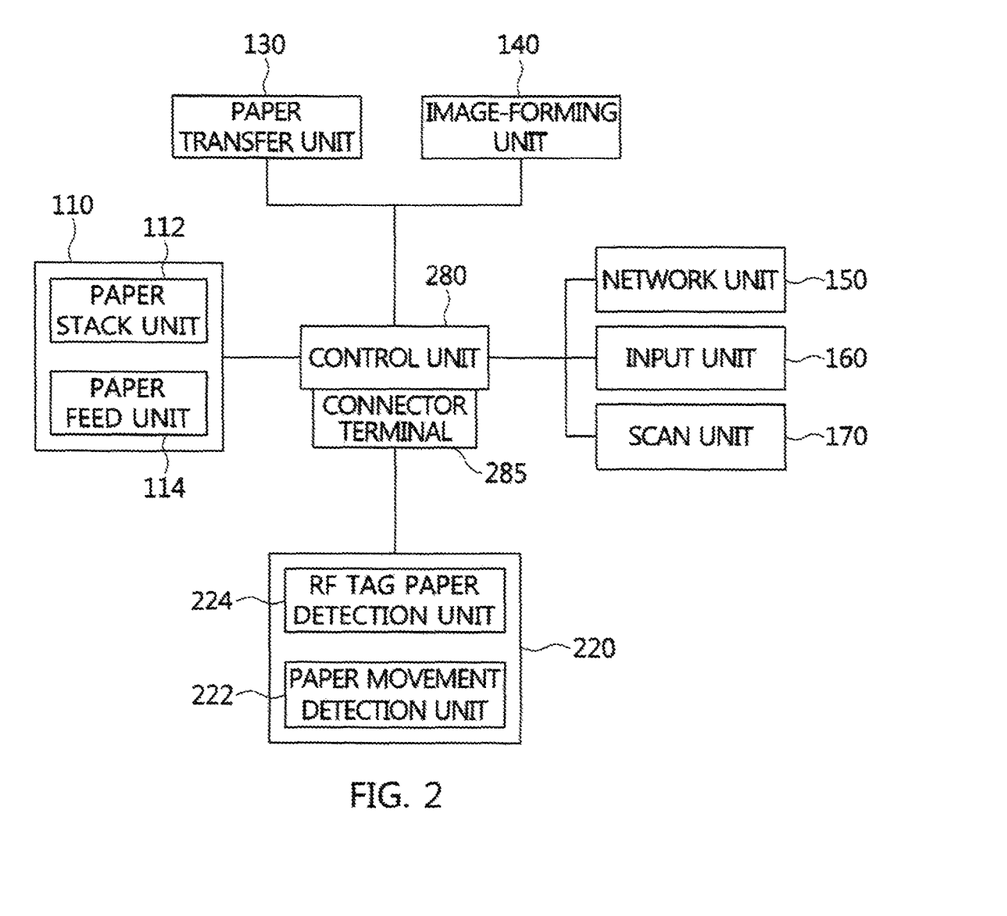
FIG. 2 is a block diagram of an image-forming apparatus according to another embodiment of the present invention.

FIG. 2 is a block diagram of an image-forming apparatus according to another embodiment of the present invention.

Generally, an image-forming apparatus includes an auxiliary connector terminal 285, which may receive an auxiliary signal. FIG. 2 illustrates the configuration in which the auxiliary connector terminal is used for receiving an RF tag presence/absence signal from a security paper detection unit 220.

As illustrated in FIG. 2, the image-forming apparatus includes a security paper cassette unit 110, a security paper detection unit 220, a paper transfer unit 130, an image-forming unit 140, a scan unit 170, and a control unit 280. Except for some operations of the security paper detection unit 220 and the control unit 280, the configuration is the same as that shown in FIG. 1. Therefore, a description of the same configuration will be omitted.

The paper movement detection unit 222 detects whether paper is being fed and whether feeding of paper is completed. To this end, the paper movement detection unit 222 may comprise a light emission unit (not illustrated) for emitting light and a light reception unit (not illustrated) for receiving the light emitted from the light emission unit. Because the paper movement detection unit 222 does not operate in conjunction with the control unit 280 at all, it must be activated as long as power is supplied to the image-forming apparatus.

The RF tag paper detection unit 224 is activated when a paper feeding detection signal from the paper movement detection unit 222 is detected, and then determines whether the moving paper is RF tag paper or common paper.

The control unit 280 may receive print command information from a PC via the network unit 150, or may receive a copy command from a user via the input unit 160. When print command information or a copy command is input, the control unit 280 controls the paper feed unit 114 in order to feed security paper, in which an RF tag is inserted, from the paper stack unit 112 of the security paper cassette unit 110.

The paper movement detection unit 222 determines whether paper is moving by being fed by the paper feed unit 114 and provides a paper feeding detection signal to the RF tag paper detection unit 224 if it is determined that paper is being fed. When the paper feeding detection signal is input from the paper movement detection unit 222, the RF tag paper detection unit 224 is activated, supplies power from the RF transmission antenna to the RF tag of the security paper, and checks whether an RF tag detection signal is input from the RF tag.

Unless an RF tag is detected before a paper feeding completion signal is input from the paper movement detection unit 222, the RF tag paper detection unit 224 provides an RF tag absence signal to the control unit 280 using the auxiliary connector terminal 285.

Before the RF tag absence signal is input from the RF tag paper detection unit 224, the control unit 280 supplies paper to the image-forming unit 140 along a transfer path by controlling the paper transfer unit 130. Then, unless the signal input from the RF tag paper detection unit 224 is switched to the RF tag absence signal, the control unit 280 prints a desired image, that is, a document received by a PC or an image of a scanned manuscript.

However, if an RF tag absence signal is input from the RF tag paper detection unit 224, the control unit 280 controls the image-forming unit 140 so as to stop the operation for forming the image. In this case, in order to stop the operation for forming the image, the control unit 280 may generate a jam error, or may control the image forming unit 140 so as not to form an image on the paper but to output the paper as a blank page.

Figure 3:
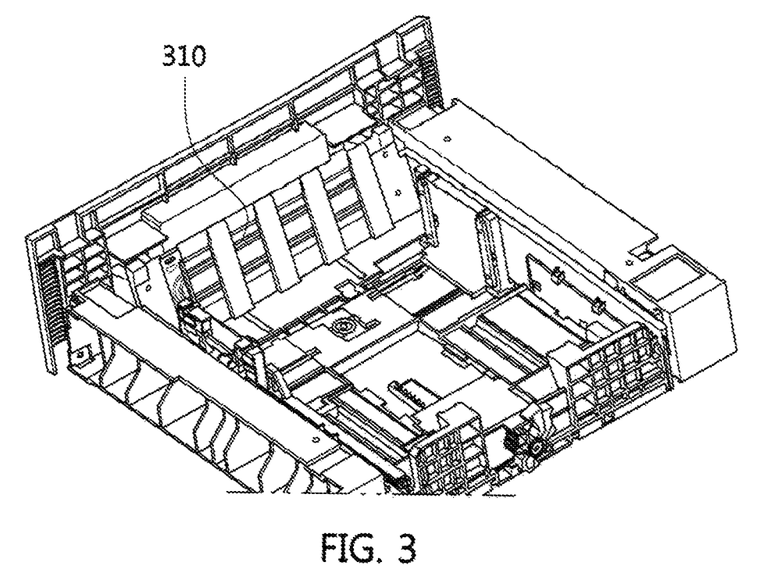
FIG. 3 is a view illustrating an example of the arrangement of an RF antenna of a security paper detection unit according to an embodiment of the present invention.

FIG. 3 is a view illustrating an example of the arrangement of an RF antenna of a security paper detection unit according to an embodiment of the present invention.

As illustrated in FIG. 3, the RF antenna 310 of the RF tag paper detection unit 224 is arranged on the side that faces the paper while the paper is being fed from the security paper cassette unit 110. Here, it is desirable for RF transmission and/or reception antennas, which are depicted as the RF antenna 310 in FIG. 3, to be arranged to cover the width of the paper in order to enable the antennas to supply power to an RF tag and to detect the RF tag regardless of the location at which the RF tag is inserted in the security paper.

Figure 4:
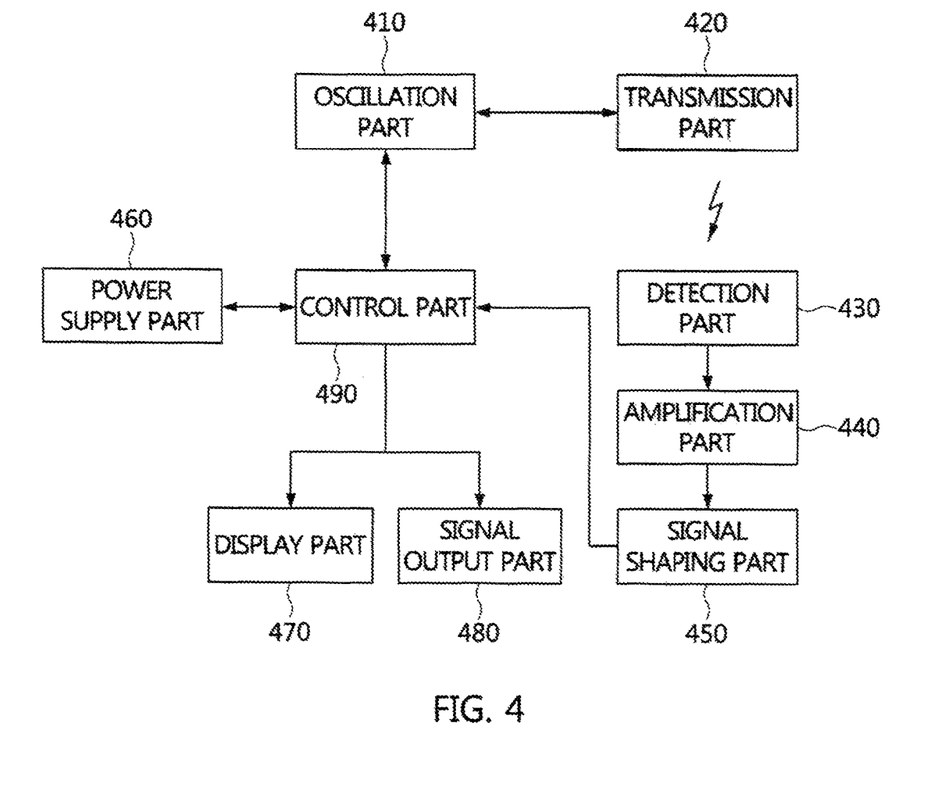
FIG. 4 is a view illustrating the configuration of the RF tag paper detection unit, illustrated in FIG. 2, in greater detail.

FIG. 4 is a view illustrating the configuration of the RF tag paper detection unit illustrated in FIG. 2 in more detail.

As illustrated in FIG. 4, the RF tag paper detection unit 224 includes an oscillation part 410, a transmission part 420, a detection part 430, an amplification part 440, a signal shaping part 450, a power supply part 460, a display part 470, a signal output part 480, and a control part 490.

An oscillator of the oscillation part 410 may use various frequencies, but in an embodiment, an 8.2 MHz 10 PPM crystal oscillator is used to provide the control part 490 and the transmission part 420 with an oscillation frequency that oscillates at a preset 8.2 MHz.

The transmission part 420 is activated when the 8.2 MHz oscillation frequency is provided from the oscillation part 410, and then transmits an 8.2 MHz transmission signal to the RF tag of security paper. The transmission part 420 includes an RF transmission antenna. Here, it is desirable to arrange the RF transmission antenna across the width direction of the paper in order to detect the RF tag, by supplying power thereto, regardless of the location of the RF tag in the paper.

The detection part 430 separates an RF signal from signals input from multiple antennas, which include not only an RF reception antenna but also an RF transmission antennas. The level of the antenna signal detected by the detection part 430 may vary depending on the speed of the signal from the RF tag inserted in the security paper and the intensity of the response signal based on the distance between the detection part 430 and the RF tag. Therefore, it is desirable for the transmission part 420 to include a switching function for controlling the intensity of output power of the RF transmission antenna and the range of the sensitivity of detecting the RF tag.

In other words, if the intensity of output power of the RF transmission antenna in the transmission part 420 is excessively strong, the detection part 430 may even detect the RF tag paper stacked in the paper stack unit 112, thus causing incorrect operation. Therefore, in order to avoid detection of the RF tag paper stacked in the paper stack unit 112, the intensity of the output power of the RF transmission antenna may be regulated. Also, while the RF paper is moving, the sensitivity of detection of the RF tag may be adjusted so as to fall within the range of 10 to 30% using a switch function.

The amplification part 440 amplifies the detected small signal output from the detection part 430. The transmission part 420, the detection part 430, and the amplification part 440 are components that greatly affect the detestable distance of the RF tag inserted in the security paper, and desirably, the sensitivity and output thereof may be set so as to enable an RF tag at least 20 mm to 50 mm distant therefrom to be detected.

The signal shaping unit converts the amplified RF signal provided from the amplification part 440 into a digital signal to be provided to the control part 490. The power supply part 460 generates power to be supplied to each of the parts, and may be supplied with direct voltage of 7V to 9V as input power in order to supply output voltage of 5V.

The display part 470 serves to represent whether, an RF tag has been detected in the security paper, and may use multiple LEDs having different colors. The signal output part 480 serves to transmit a security paper feeding detection signal to the main body of the image-forming apparatus. The signal output part 480 may output a high signal in a standby state or when an RF tag is detected from security paper, but may output a low signal when common paper is detected.

Figure 5:
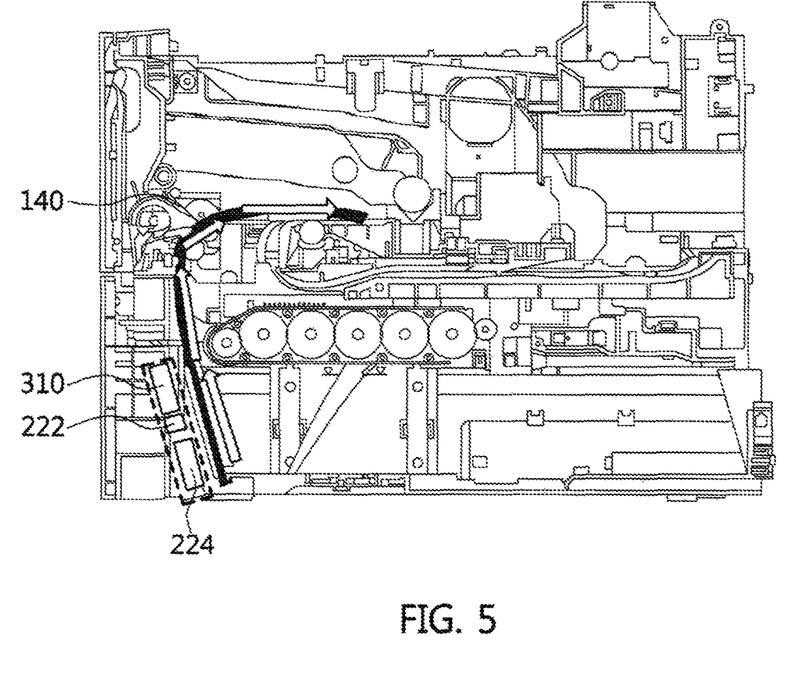
FIG. 5 is a view illustrating an example of the configuration of the system of the image-forming apparatus illustrated in FIG. 2.

FIG. 5 is a view illustrating an example of the configuration of the system of the image-forming apparatus illustrated in FIG. 2.

As illustrated in FIG. 5, it is desirable that an RF antenna 310 be arranged in the upper part of the security paper cassette unit 110 and that the paper movement detection unit 222 be arranged below the RF antenna 310. Accordingly, the movement of the paper fed by the paper feed unit 114 may be easily detected, and the RF tag signal from the security paper may be easily detected.

When print command information or a copy command is input, the control unit 280 controls the paper feed unit 114 in order to feed security paper, in which an RF tag is inserted, from the paper stack unit 112 of the security paper cassette unit 110.

The paper movement detection unit 222 detects whether the paper is moving by being fed from the paper feed unit 114, and provides a paper feeding detection signal to the RF tag paper detection unit 224 if feeding of the paper is detected. The RF tag paper detection unit 224 supplies power from the RF transmission antenna to the RF tag of the security paper and checks whether an RF tag signal is input from the security paper.

The control unit 280 provides paper to the image-forming unit 140 along a transfer path by controlling the paper transfer unit 130 before an RF tag absence signal is input from the RF tag paper detection unit 224.

Figure 6:
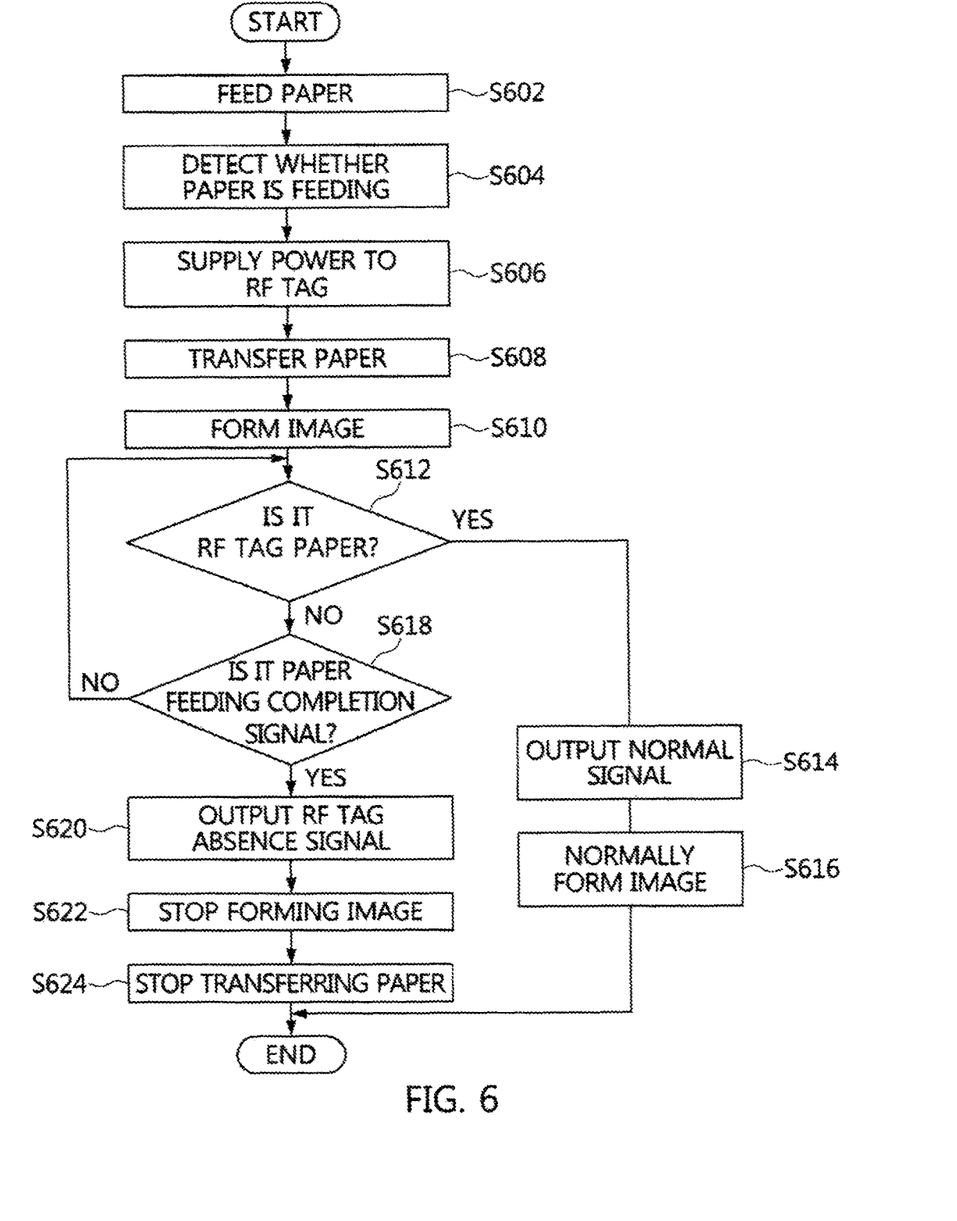
FIG. 6 is a flowchart of an image-forming method according to a further embodiment of the present invention.

FIG. 6 is a flowchart of an image-forming method according to another embodiment of the present invention.

If print command information or a copy command is input, the control unit 280 operates the paper feed unit 114 of the security paper cassette unit 110 in order to feed security paper from the security paper cassette unit 110, whereby security paper, in which an RF tag is inserted, is fed from the paper stack unit 112 at step S602.

At step S604, the paper movement detection unit 222 detects whether the paper is moving by being fed by the paper feed unit 114. If feeding of the paper is detected, the paper movement detection unit 222 provides a paper feeding detection signal to the RF tag paper detection unit 224. When the paper feeding detection signal is input from the paper movement detection unit 222, the RF tag paper detection unit 224 is activated and supplies power from the RF transmission antenna to the RF tag of the security paper at step S606.

At step S608, the control unit 280 transfers the paper along a transfer path so as to supply the paper to the image-forming unit 140 by controlling the paper transfer unit 130. At step S610, the control unit 280 forms an image of a document received by a PC or an image of a scanned manuscript by controlling the image-forming unit 140.

At step S612, the RF tag paper detection unit 224 checks whether an RF tag detection signal is input from the RF tag of the security paper. If the RF tag detection signal from the RF tag of the security paper is detected, the RF tag paper detection unit 224 continuously outputs a normal signal at step S614. Unless the signal from the RF tag paper detection unit 224 is switched to an RF tag absence signal, the document received by the PC or the image of the scanned manuscript is normally formed at step S616.

Unless an RF tag is detected at step S618 before a paper feeding completion signal is input from the paper movement detection unit 222, the RF tag paper detection unit 224 outputs an RF tag absence signal to be provided to the control unit 280 via the auxiliary connector terminal 285 at step S620. If the RF tag absence signal is input from the RF tag paper detection unit 224, the control unit 280 generates a warning alarm and simultaneously controls the image-forming unit 140 so as to stop the operation of forming an image at step S622. Also, if the RF tag absence signal is a jam-type signal, the control unit 280 may stop the operation of transferring the paper at step S624 by controlling the paper transfer unit 130.

As described above, the present invention forms an image only on security paper in which an RF tag is inserted, whereby documents may be presented from being leaked.

Also, the present invention may reduce development costs and purchase costs merely by replacing a security paper cassette unit, because a security paper detection unit is contained in the security paper cassette unit.

Also, the present invention may regulate power, which is output from an RF transmission antenna, whereby erroneous operation caused by detecting sheets of RF tag paper stacked in a paper stack unit may be prevented.

As described above, embodiments of the present invention have been disclosed in the drawings and the specification. Although specific terms have been used in the present specification, these are merely intended to describe the present invention, and are not intended to limit the meanings thereof or the scope of the present invention described in the accompanying claims. Therefore, those skilled in the art will appreciate that various modifications and other equivalent embodiments are possible from the embodiments. Therefore, the technical scope of the present invention should be defined by the technical spirit of the claims.

What is claimed is:

1. An image-forming apparatus, comprising: one or more units being configured and executed by a control unit using algorithm associated with least one non-transitory storage device, the one or more units comprising, a security paper cassette unit that includes a paper stack unit in which sheets of paper are stacked and a paper feed unit for feeding the paper stacked in the paper stack unit; a security paper detection unit that includes an RF tag paper detection unit for detecting whether the paper fed by the paper feed unit is RF tag paper in which an RF tag is inserted; in response to detection of an RF tag detection signal from the RF tag paper, the signal indicating the paper is the RF tag paper, the RF tag detection signal being detected by the RF tag paper detection unit which including an RF transmission antenna and an RF reception antenna which being arranged to cover an entire width of the paper so as to enable an RF tag inserted in the RF tag paper to be supplied with power and to be detected regardless of the location of the RF tag in the security paper, an image-forming unit for forming an image on paper; a paper transfer unit for providing the paper fed from the security paper cassette unit to the image-forming unit along a transfer path, wherein controls the paper transfer unit so as to provide the paper fed from the security paper cassette unit to the image-forming unit along the transfer path, and controls the image-forming unit so as to normally form a desired image on the moving RF tag paper in response to detection of the RF tag detection signal.

2. The image-forming apparatus of claim 1, wherein:
the security paper detection unit further comprises a paper movement detection unit for detecting whether the paper is being fed; and
the control unit controls the RF tag paper detection unit so as to be activated if a paper feeding detection signal is input from the paper movement detection unit.

3. The image-forming apparatus of claim 2, wherein
in response to detection of completion signal is input from the paper movement detection unit but the RF tag detection signal is not input from the RF tag paper detection unit, the control unit generates a warning alarm and simultaneously controls the image-forming unit so as to stop forming an image on the moving paper.

4. An image-forming apparatus, comprising: one or more units being configured and executed by a control unit using algorithm associated with least one non-transitory storage device, the one or more units comprising, a security paper cassette unit that includes a paper stack unit in which sheets of paper are stacked and a paper feed unit for feeding the paper stacked in the paper stack unit; a security paper detection unit that includes a paper movement detection unit for detecting, whether paper is being fed and an RF tag paper detection unit for outputting an RF tag presence/absence signal by detecting whether the paper detected by the paper movement detection unit is RF tag paper in which an RF tag is inserted in response to detection of a paper feeding detection signal is input from the paper movement detection unit; in response to detection of an RF tag detection signal from the RF tag paper, the signal indicating the paper is the RF tag paper, the RF tag detection signal being detected by the RF tag paper detection unit which including an RF transmission antenna and an RF reception antenna which being arranged to cover an entire width of the paper so as to enable an RF tag inserted in the RF tag paper to be supplied with power and to be detected regardless of the location of the RF tai in the security paper, an image-forming unit for forming an image on paper; a paper transfer unit for providing the paper fed from the security paper cassette unit to the image-forming unit along a transfer path, wherein the control unit controls the paper feed unit so as to feed a single sheet of paper from the paper stack unit by generating an input command for forming an image on RF tag paper, controls the paper transfer unit so as to provide the paper fed from the security paper cassette unit to the image-forming unit along the transfer path, and controls the image-forming unit so as to normally form a desired image on the RF tag paper until receipt of an RF tag absence signal.

5. The image-forming apparatus of claim 4, wherein the RF tag paper detection unit is activated in response to detection of the paper feeding detection signal is input from the paper movement detection unit, and supplies power from an RF transmission antenna to the RF tag paper.

6. The image-forming apparatus of claim 5, wherein the RF tag paper detection unit comprises:
a transmission part for supplying power to an RF tag of the RF tag paper through an RF transmission antenna;
a reception part for receiving a tag signal from the RF tag through an RF reception antenna; and
a signal shaping part for converting the tag signal received by the reception part into a digital signal, wherein
the control unit determines whether moving paper is RF tag paper based on the digital signal input from the signal shaping part.

7. The image-forming apparatus of claim 6, wherein the reception part receives the tag signal from the moving RF tag paper through both of the RF reception antenna and the RF transmission antenna.

8. The image-forming apparatus of claim 7, wherein
the transmission part includes multiple switching functions for adjusting an intensity of output power of the RF transmission antenna, and
the control unit controls the multiple switching functions of the transmission part based on a level of the tag signal from the RF tag, which is received by the reception part.

9. The image-forming apparatus of claim 6, further comprising:
a connector terminal for receiving an RF tag absence signal, which is output from the RF tag paper detection unit; and
the control unit generates a jam error in response to detection of the RF tag absence signal via the connector terminal.

10. The image-forming apparatus of claim 6, further comprising:
a connector terminal for receiving an RF tag absence signal, which is output from the RF tag paper detection unit; and
the control unit controls the image-forming unit so as not to form an image on the moving paper but to print the paper as a blank page in response to detection of the RF tag absence signal via the connector terminal.

11. A computer-implemented image-forming method performed in an image-forming apparatus that includes a paper stack unit in which sheets of paper are stacked and an image-forming unit for forming an image on a paper, the method comprising:
feeding paper from the paper stack unit in response to detection of a command for forming an image on RF tag paper in which an RF tag is inserted;
detecting whether paper is moving by being fed;
detecting whether the moving paper is RF tag paper in response to detection of a paper feeding signal, the paper feeding signal being detected by an RF tag paper detection unit which including an RF transmission antenna and an RF reception antenna which being arranged to cover an entire width of the paper so as to enable an RF tae inserted in the RF tag paper to be supplied with power and to be detected regardless of the location of the RF tag in the security paper;

transferring the paper supplied in the feeding to the image-forming unit along a transfer path; and forming a desired image on the RF tag paper by controlling the image-forming unit until receipt of an RF tag absence signal.

12. The method of claim 11, further comprising:

activating the detection whether the moving paper is RF tag paper in response to detection of movement of paper.

13. The method of claim 12, further comprising:

in response to detection of the RF tag absence signal, generating a warning alarm and simultaneously generating a jam error in order to terminate forming an image on the moving paper.

14. The method of any one of claim 13, further comprising:

supplying power to an RF tag of the RF tag paper through an RF transmission antenna;

receiving a tag signal from the RF tag, through an RF reception antenna;

converting the received tag signal into a digital signal; and determining whether the moving paper is RF tag paper based on the digital signal.

15. The method of claim 14, wherein the tag signal is received from the RF tag through both of the RF reception antenna and the RF transmission antenna.

16. The method of claim 15, further comprising:

controlling multiple switching functions for adjusting an intensity of output power of the RF transmission antenna based on a level of the tag signal received from the RF tag.

* * * * *